E. O. BARSTOW.
EXTRACTION PROCESS.
APPLICATION FILED JAN. 22, 1912.
1,171,408.
Patented Feb. 15, 1916.
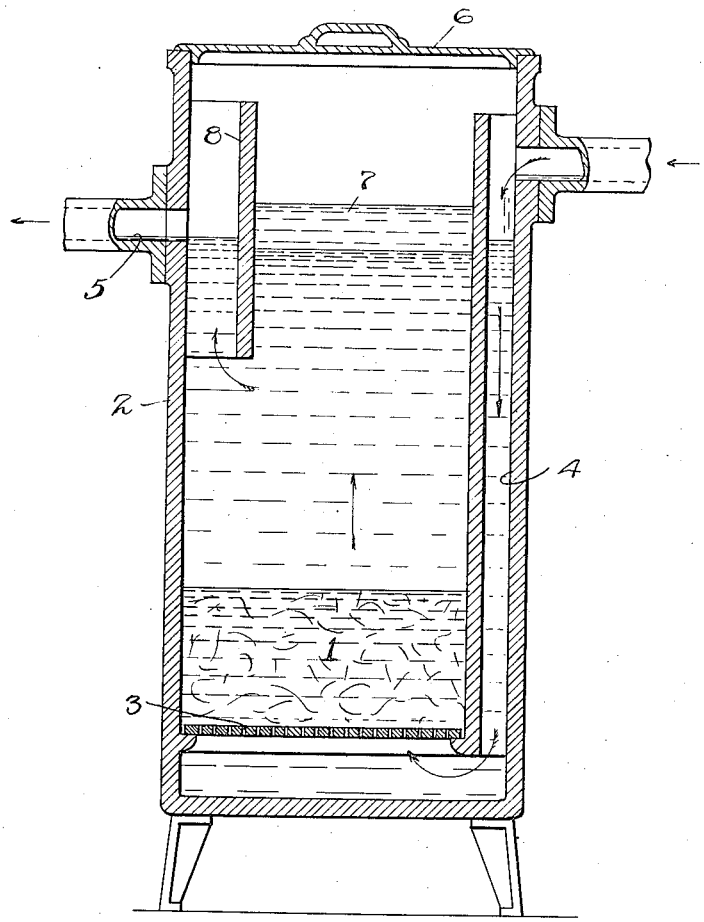
WITNESSES
Oliver M. Kappler.
Jno. F. Oberlin
INVENTOR
Edwin O. Barstow
BY J. B. Fay
ATTORNEY

UNITED STATES PATENT OFFICE.

EDWIN O. BARSTOW, OF MIDLAND, MICHIGAN, ASSIGNOR OF ONE-HALF TO THOMAS GRISWOLD, JR., OF MIDLAND, MICHIGAN.

EXTRACTION PROCESS.

1,171,408.   Specification of Letters Patent.   Patented Feb. 15, 1916.

Application filed January 22, 1912. Serial No. 672,539.

*To all whom it may concern:*

Be it known that I, EDWIN O. BARSTOW, a citizen of the United States, and a resident of Midland, county of Midland, and State of Michigan, have invented a new and useful Improvement in Extraction Processes, of which the following is a specification, the principle of the invention being herein explained and the best mode in which I have contemplated applying that principle, so as to distinguish it from other inventions.

The present invention, which is an improvement in methods for the extraction of substances by means of volatile solvents, has general application in the art, but is more particularly applicable to the extraction of oleaginous substances by means of chlorinated solvents, such for example as carbon tetrachlorid. The general mode of operation in extracting substances by means of volatile solvents involves bringing the material to be treated into contact with such solvent; the separation from the material of the resulting solution of the substance to be extracted, i. e. the extract, or the excess of the same; and the recovery of the extracted substance from the extract, by distilling off the solvent. The vaporized solvent is then condensed and used for a subsequent extraction. The solvent most commonly employed for extraction purposes at present, is naphtha, but while this is a good and relatively cheap solvent, its use is limited, first, by reason of its great inflammability and the highly explosive nature of its mixtures with air, and, second, by reason of the difficulty encountered in removing all traces of the naphtha from the material treated, and from the extracted oil and grease. While carbon tetrachlorid has long been recognized by those acquainted with its properties, as a nearly perfect solvent for the extraction of oleaginous matters, attempts heretofore to substitute it for naphtha, have so far as advised, been failures, the occasion for the failure being the tendency of carbon tetrachlorid to corrode the iron or other metallic apparatus, pipes or vessels in which it is used, stored, or distilled incidentally to its employment in the extraction process. Some tendency to corrode is experienced even where naphtha is employed, but that experienced with carbon tetrachlorid is much more marked.

The present improved process accordingly has as its object, the overcoming of the difficulty just referred to, especially in connection with the use of carbon tetrachlorid as the volatile solvent. In this way it is rendered possible to substitute for the naphtha, the carbon tetrachlorid with its various superior qualities, among which may be mentioned, that it is a heavy, clear liquid of definite composition and fixed boiling point, in addition to being non-inflammable and non-explosive. Not only is its boiling point fixed, but such point is lower than that of naphtha, so that traces of it may be more readily removed from the extract.

To the accomplishment of the foregoing and related ends the invention then consists of the steps hereinafter fully described and particularly pointed out in the claims.

The annexed drawing and the following description set forth in detail, one approved method of carrying out the invention, such disclosed method, however, constituting but one of several ways in which the principle of the invention may be used.

In said annexed drawing the single figure there appearing, is a sectional view of an apparatus adapted for carrying on the present improved extraction process.

This process is based on the discovery that the corrosive action, which as noted above, is the only objectionable feature to the employment of carbon tetrachlorid in the use under consideration, may be greatly reduced and practically eliminated by bringing the recovered solvent into contact with a substance of a basic character, chemically speaking; that is, a substance capable of neutralizing an acid. My experiments would indicate that this solvent actually suffers a slight decomposition in the presence of moisture at the temperatures employed in recovering it from the extract, some hydrochloric acid being formed, which imparts acidity to the extract. Some of this acid distills over, and is condensed with the recovered solvent which is thereby also made acid. More acid is formed in each subsequent extraction, so that a cumulative effect is produced, the degree of acidity of the solvent soon becoming such as to render the solvent capable of doing serious injury to the apparatus. Other volatile acids present in the material being treated, will often be present in the extract and recovered solvent, accumulating in the latter in the fashion just described, and adding to the corrosive effect.

I have accordingly found it desirable to treat the solvent with a neutralizing agent as above explained, after each successive recovery from the extract, whereby each small increment of acidity is corrected or neutralized almost as soon as formed, and the destructive effects of accumulative acidity avoided.

Common dry slaked lime is conveniently employed for the neutralizing agent where the solvent being treated is carbon tetrachlorid; but other substances such as calcium carbonate, soda ash, potash and the like, may be used instead. The exact manner of treating the solvent, and the arrangement of apparatus will depend upon the manner in which the solvent is used; preferably, however, the solvent is caused to pass upwardly through a body of the neutralizing agent, this being the arrangement illustrated in the drawing, where the body of neutralizing agent 1, is shown as contained in a tank 2, provided with a perforated false bottom 3. The solvent to be treated, is led in under the false bottom, through a passage or conduit 4; thence it rises, passing incidentally through the body or layer of neutralizing agent until it fills the tank to the level of the outlet 5. The body of the tank affords a settling zone where any fine particles of solid matter carried along by the solvent may separate out, leaving such solvent clarified as well as neutralized. A tight cover 6, is provided to prevent loss of solvent by evaporation, and either as an alternative, or additional precaution for preventing such evaporation, a layer 7, of water may be placed on the solvent. Where water is thus employed to form the upper layer of liquid in the tank, the outlet requires to be provided with a trap 8, as shown in the figure of the drawing. Both such trap, and the passage 4, are open at the top to prevent siphoning and irregular flow.

The arrangement of the apparatus just described lends itself more especially to the use of dry slaked lime, previously referred to as being conveniently employed for the neutralizing agent, for the reason that such lime will almost but not quite float in carbon tetrachlorid. Accordingly, it settles onto the bottom 3, much as a flocculent precipitate, and does not form a compact mass which might retard the flow of the liquid, and, what is more important, only be brought into partial contact therewith.

The foregoing apparatus will ordinarily be conveniently interposed in the line conducting the solvent from the condenser where it is condensed following its separation from the extract, to the receptacle used for collecting said solvent preliminarily to its reëmployment in the extraction process proper; but obviously both the precise construction of the neutralizer and its location may be varied so long as the result described is satisfactorily accomplished.

By means of the foregoing improved mode of treatment of the volatile solvent in extraction processes, it is rendered entirely feasible and practicable to employ carbon tetrachlorid for the solvent, and thus realize the various desirable qualities of such solvent, which has heretofore been employed only in the most limited fashion because of its corrosive effect. It should also be remarked that the mode of treatment under consideration, is applicable to other solvents, the corrosive effects of naphtha, for instance, although much less serious than in the case of carbon tetrachlorid, being equally and satisfactorily eliminated. Among such other solvents, in addition to naphtha, may be enumerated the several chlorinated solvents, such as tetrachlorethane, tetrachlorethylene and chloroform.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In an extraction process of the character described employing a chlorinated solvent, the step which consists in passing the solvent recovered from the extracted material through a relatively stationary mass composed of a suitable neutralizing agent, and thereupon allowing such solvent to settle.

2. In an extraction process of the character described employing a chlorinated solvent, the step which consists in passing the solvent recovered from the extracted material through a relatively stationary mass composed of dry slaked lime.

3. In an extraction process of the character described employing a chlorinated solvent, the step which consists in passing the solvent recovered from the extracted material upwardly through a collected body of such solvent including a layer of neutralizing agent.

4. In an extraction process of the character described employing a chlorinated solvent, the step which consists in passing the solvent recovered from the extracted material upwardly through a layer of dry slaked lime included at the bottom of a collected body of such solvent.

5. The method of separating the more soluble constituents of a material from the relatively less soluble constituents thereof, which consists of the following cycle of steps, viz: treating such material with a chlorinated solvent; recovering such solvent from the extracted material by distillation; treating such recovered solvent with a neutralizing agent; and then treating more material with such solvent; and then repeating such cycle.

6. The method of separating the more soluble constituents of a material from the relatively less soluble constituents thereof, which consists of the following cycle of steps, viz: treating such material with a chlorinated solvent; recovering such solvent from the extracted material by distillation; passing such recovered solvent through a mass composed of a suitable neutralizing agent; and then treating more material with such solvent; and then repeating such cycle.

7. The method of separating the more soluble constituents of a material from the relatively less soluble constituents thereof, which consists of the following cycle of steps, viz: treating such material with a chlorinated solvent; recovering such solvent from the extracted material by distillation; passing such recovered solvent through a relatively stationary mass composed of a suitable neutralizing agent; thereupon allowing such solvent to settle; and then treating more material with such solvent; and then repeating such cycle.

8. The method of separating the more soluble constituents of a material from the relatively less soluble constituents thereof, which consists of the following cycle of steps, viz: treating such material with carbon tetrachlorid, whereby an extract of such more soluble constituents in such tetrachrolid is formed; recovering such tetrachlorid from such extract by distillation; passing such recovered tetra-chlorid upwardly through a collected body of the same including a layer of neutralizing agent; and then treating more material with such tetrachlorid; and then repeating such cycle.

9. The method of separating the more soluble constituents of a material from the relatively less soluble constituents thereof, which consists of the following cycle of steps, viz: treating such material with carbon tetrachlorid whereby an extract of such more soluble constituents in such tetrachlorid is formed; recovering such tetrachlorid from such extract by distillation; passing such recovered tetrachlorid upwardly through a layer of dry slaked lime included at the bottom of a collected body of such tetrachlorid; and then treating more material with such tetrachlorid; and then repeating such cycle.

Signed by me this 18th day of January, 1912.

EDWIN O. BARSTOW.

Attested:
   LEO W. LOWE,
   A. N. PATRIARCHE.